No. 65,648.  
S. F. CRAIG.  
WELL TUBE.  
PATENTED JUNE 11. 1867.
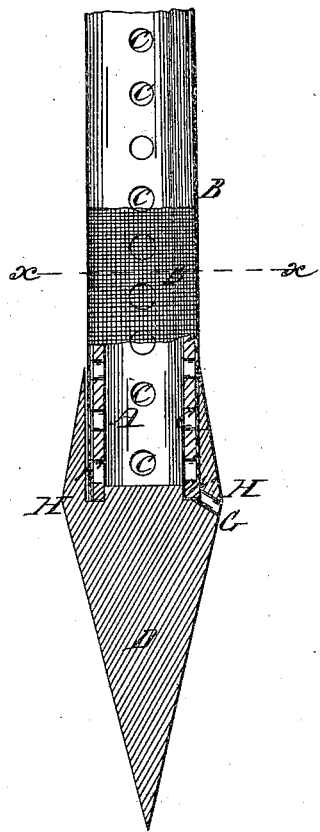
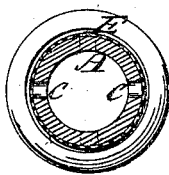

United States Patent Office.

S. F. CRAIG, OF EDDYVILLE, IOWA.

Letters Patent No. 65,648, dated June 11, 1867.

---

IMPROVED WELL-TUBE.

---

The Schedule referred to in these Letters Patent and making part of the same.

---

TO ALL WHOM IT MAY CONCERN:

Be it known that I, S. F. CRAIG, of Eddyville, in the county of Wapello, and State of Iowa, have invented certain new and useful improvements in "Well-Tubes;" and I do hereby declare that the following is a full, clear, and exact description thereof, which will enable others skilled in the art to make and use the same, reference being had to the accompanying drawing, forming part of this specification.

The present invention relates to those well-tubes which at one end are perforated and provided with a sharp point or drill-head, and the invention consists in the attachment to the perforated sides of the well-tube of a wire screen or gauze, to prevent sand, dust, etc., from entering the well-tube through its perforations, and thus from being drawn up through the tube to the pump, to which much injury has heretofore resulted from the presence of sand with well-tubes having no protecting screen or gauze. The invention also consists in a novel construction of the point or drill-head to the well-tube, whereby many advantages are secured, which will be obvious from the following description and be also hereinafter mentioned. In the accompanying plate of drawings my improvements in well-tubes are illustrated—

Figure 1 being a side view of the perforated and pointed end of the well-tube, with the point in central vertical section; and Figure 2 a transverse section taken in the place of the line x x, fig. 1.

A, in the drawings, represents the perforated end of a well-tube, around which a wire screen or gauze, B, is secured by soldering it at all points except where the perforations C are; this screen B preventing the sand from passing through the perforations into the tube and thence to the pump, to which much injury would result were not the screen thus used and applied. D, the point to the tube, to which, at its perforated end, it is secured, with a space or chamber, E, around the end of the tube, from which, at the lower end, F, of the chamber, extends an air-passage, G, out through the thickness of the side of the point or drill-head. The drill-head is larger in diameter at H than that of the tube, so that, when driven through the ground, it will leave or make a hole larger than the tube. This enlargement not only enables the tube to be withdrawn with greater ease, if so desired, but also serves to keep the sand or dust from the screen to the perforated end, as the tube is driven. By means of the chamber around the perforated end of the tube, between it and the drill-head, together with its outlet or passage G, which opens at the side of the drill-head below its enlarged diameter, the drawing up of the well-tube is greatly facilitated, as it secures a passage for air to the space or opening below the drill-head as it moves or passes up.

Having thus described my invention, what I claim as new, and desire to secure by Letters Patent, is—

The combination and arrangement of the perforated end A of the well-tube, around which the wire screen or gauze B is placed; point D, secured to the end of said tube, forming the chamber E and air-passage G, as herein set forth, for the purpose specified.

S. F. CRAIG.

Witnesses:
GEORGE MALE,
G. W. BARNETT.